United States Patent [19]

Rieger et al.

[11] 4,060,269
[45] Nov. 29, 1977

[54] EQUALIZING HEAD FOR CHAIN SLINGS

[76] Inventors: Werner Rieger, Haus Haselbach, 7080 Aalen 9; Manfred Böning, Klistostrasse 20a, 1000 Berlin 37; Hans Dalferth, Haydnstrasse 21, 7083 Wasseralfingen; Reinhard Smetz, Baldingerstrasse 2, 8860 Nordlingen, all of Germany

[21] Appl. No.: 675,179

[22] Filed: Apr. 8, 1976

[30] Foreign Application Priority Data

Apr. 15, 1975 Germany .............................. 2516817
Apr. 15, 1975 Germany ........................ 7512193[U]
Apr. 15, 1975 Germany ........................ 7512194[U]

[51] Int. Cl.$^2$ .............................................. B66C 1/10
[52] U.S. Cl. ..................................... 294/78 A; 294/74
[58] Field of Search .................. 294/78 A, 86 LS, 74, 294/75, 76, 78 R, 1 R; 188/94; 254/192; 24/116 A, 115 C, 115 G, 115 H, 132 AS, 132 HL

[56] References Cited

U.S. PATENT DOCUMENTS

| 2,139,294 | 12/1938 | Weigant | 294/78 R |
| 2,700,568 | 1/1955 | Mieli | 294/78 R |
| 2,820,661 | 1/1958 | Koons et al. | 294/74 |
| 3,837,697 | 9/1974 | Goodrich | 294/78 A |

FOREIGN PATENT DOCUMENTS 624,753  6/1949  United Kingdom .................. 294/74

Primary Examiner—James B. Marbert
Attorney, Agent, or Firm—Haynes N. Johnson; Mark P. Stone

[57] ABSTRACT

The invention relates to an equalizing head for a chain sling comprising a connecting member for a hanger to suspend the head from a hoist hook or the like, and additional connecting members for the several falls of chain of the sling, whereby the connecting member for the hanger is a clevis type shackle of round section steel, having shanks inserted into at least one hole provided in the equalizing head for their reception and being detachably held therein by locking element.

13 Claims, 13 Drawing Figures

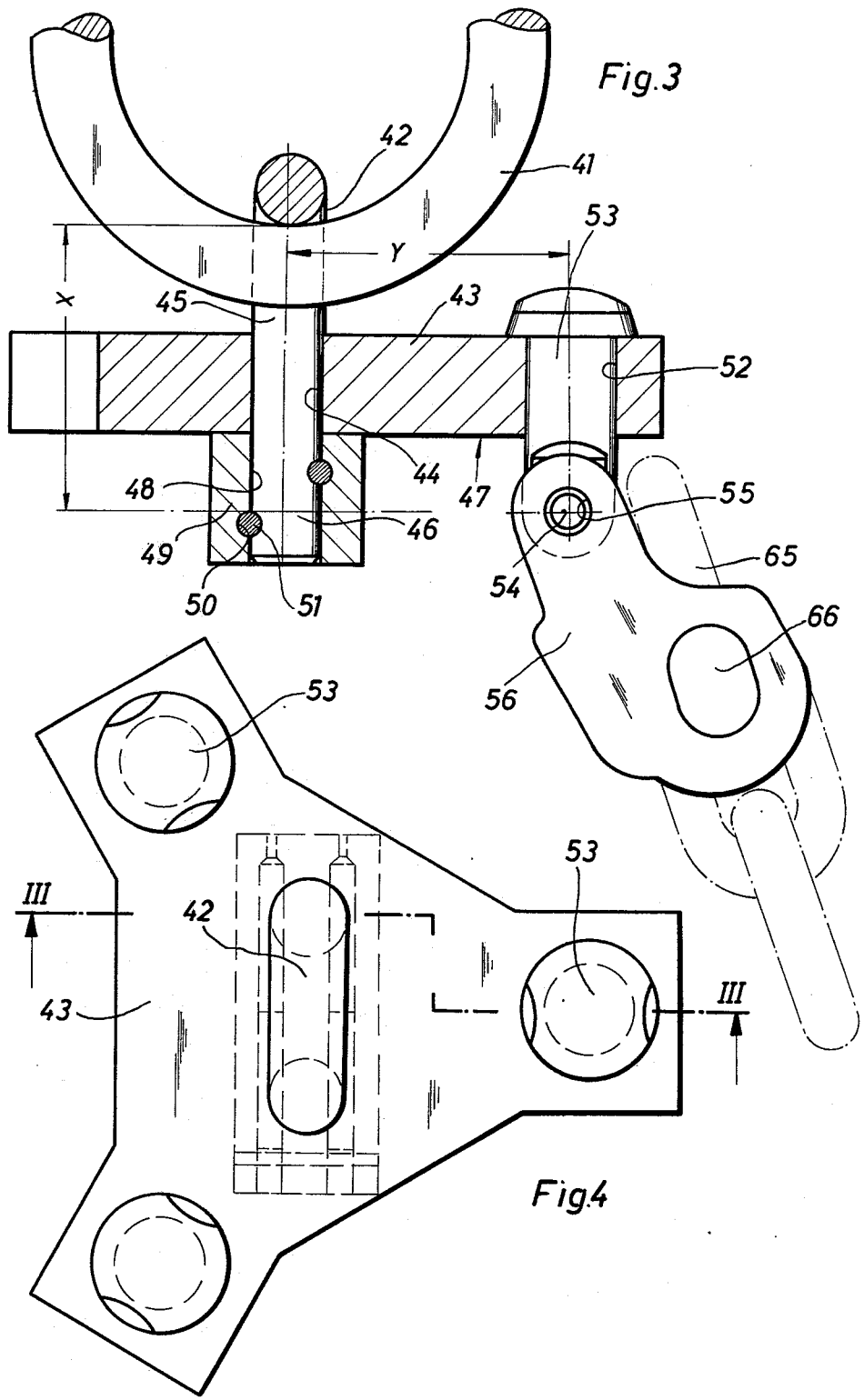

EQUALIZING HEAD FOR CHAIN SLINGS

The invention relates to an equalising head for a chain sling comprising a connecting member for a hanger to suspend the head from a hoist hook or the like, and additional connecting members for the several falls of chain of the sling.

An equalising head of such a kind is already known in the art. The connecting member for the hanger in this head is a pin which at the top of the equalising head bridges the gap between two lugs provided with holes for the reception of the pin.

This known form of construction is not entirely satisfactory primarily for at least two reasongs. The first is that the pin between the two lugs is subjected to a bending load and in the event of its deformation due to overloading, it is difficult to remove it from its holes. However, it is particularly desirable that such a pin should be easily removable for the purpose of replacing either the pin or the hanger when either of them have worn. The second reason is that the hanger can in practice move in relation to the equalising head substantially in only one plane, namely about an axis parallel to that of the pin, i.e. perpendicularly to the plane containing the sides of the hanger. Therefore, whenever a non-uniform distribution of loads applies a tilting moment to the equalising head seeking to tilt the head about an axis parallel to the plane containing the sides of the hanger, then the sides of the latter may be forced against one of the lugs and thus undesirably subjected to a bending load.

It is therefore an object of the invention to provide an equalising head which is as freely movable in relation to the hanger as possible, and in which the replacement of the connecting member and/or of the hanger can be easily effected when these have been subjected to an overload.

According to the invention this is achieved by providing a connecting member for the hanger in the form of a clevis type shackle of round section steel, having shanks inserted into at least one hole provided in the equalising head for their reception and being detachably held therein by locking elements.

The proposed equalising head has the advantage that it is able easily to swing into any position required by the distribution of the load. The clevis type shackle and/or the hanger can be easily replaced because those parts of the shackle which serve to hold it in position cannot be deformed. The choice of a clevis type shackle is also advantageous because the distance between the equalising head proper and the point of contact between the hanger and the shackle can be kept short, a circumstance which assists in allowing the equalising head to swing into the most favourable position for supporting the load easily and quickly.

The invention will now be more particularly described with reference to the accompanying drawing in which FIG. 1 is a view of an equalising head from below, and FIG. 2 is a section taken on the line II — II in FIG. 1;

FIG. 3 is a part sectional side elevation of another equalising head;

FIG. 4 is a partial view from above of the equalising head in FIG. 3;

Figure 1:
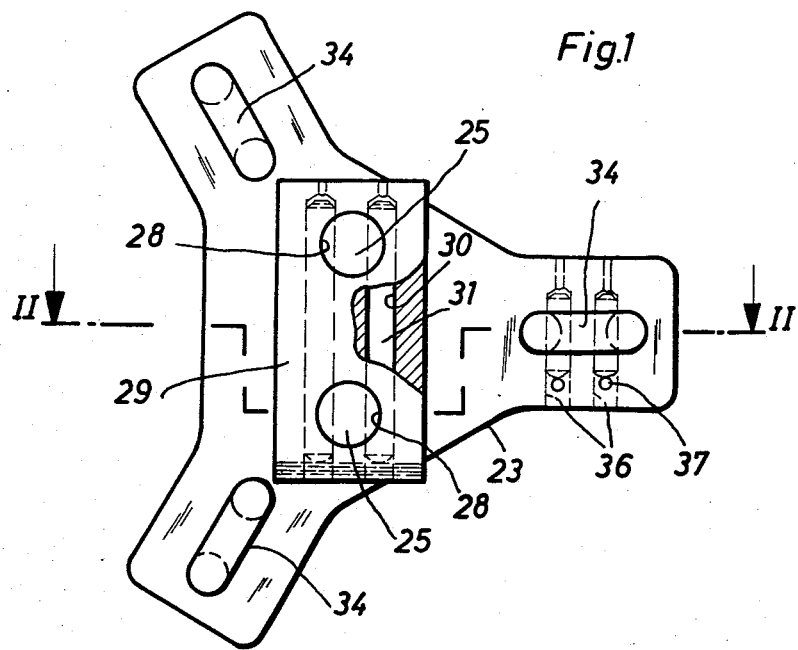
Figure 2:
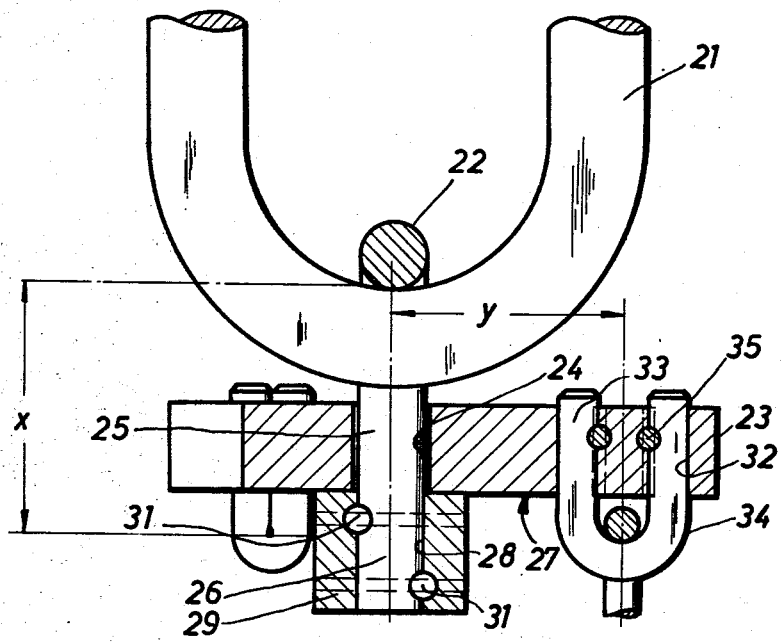

Referring first to FIGS. 1 and 2 there is provided a ring 21 which can be hung on a hoist hook not shown in the drawing. This ring is connected by a clevis type shackle 22 to the body 23 of an equalising head for a chain sling. For this purpose the body is provided with holes 24 for the reception of the shanks 25 of the shackle 22. The ends 26 of the shanks 25 project from the underside 27 of the body 23, and extend into holes 28 for their reception in an anchoring element 29 which contains transverse bores 30 for locking pins 31. Part of the circumference of the locking pins engages corresponding grooves in the ends of the shanks 25. By reference to FIG. 2 it will be seen that the grooves which are not identified by reference numbers are relatively staggered in the axial direction of the shanks. The anchoring element 29 itself has the form of a plate which may be attached by welding to the underside of the body 23.

The body 23 of the equalising head in FIGS. 1 and 2 is a plate-shaped member easy to produce. This plate-shaped member is provided with further holes 32 for the reception of the shanks 33 of shackles 34 which are like the above-described shackle 22 in also being of clevis type. The shanks 33 of these shackles are likewise held in position by locking pins contained in transverse bores 36 and located so that part of their circumference engages a corresponding groove in the co-operating shank 33 of the shackle 34. These transverse bores 36 have a shorter and wider diameter portion to enable the locking pins 35 to be more easily removed. Retaining pins 37 keep the locking pins 35 in position in the transverse bores 36.

In the embodiment illustrated in FIG. 3 a ring 41 is similarly adapted to be hung on a hoist hook not shown in the drawing. This ring is connected by a clevis type shackle 42 to the body 43 of an equalising head for a chain sling. For this purpose the body is provided with holes 44 through which the shanks 45 of the shackle can pass. The ends 46 of the shanks 45 project from the underside 47 of the body 43 and extend into holes 48 for their reception in an anchoring element 49 which contains transverse bores 50 for locking pins 51. Part of the circumference of the locking pins engages corresponding grooves in the ends of the shanks 45. By reference to FIG. 3 it will be seen that the grooves which are not identified by reference numbers are relatively staggered in the axial direction of the shanks. The anchoring element 49 itself has the form of a plate.

The body 43 can be readily produced by cutting with an oxyacetylene torch. At three points on its circumference it is provided with holes 52 for the reception of connecting elements 53 in the form of swivel pins. The bottom end of each swivel pin 53 is fitted with a transverse pivot pin 54 which engages holes 55 in a chain shortening coupler 56. The use of swivel pins for the connecting elements ensures that the falls of the chain sling will not be torsionally stressed by twisting.

Figure 5:
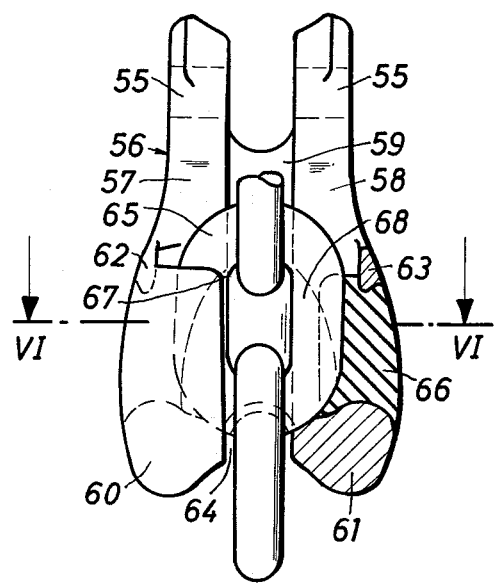
FIG. 5 is a larger scale view of a chain shortening grab link which can be used for an equalising head according to FIGS. 3 and 4.
Figure 6:
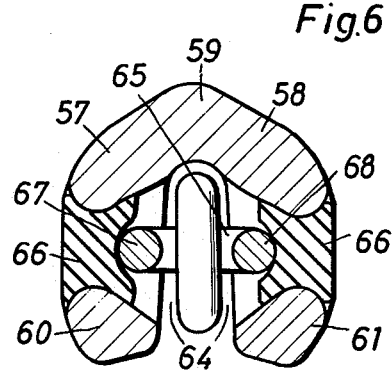
FIG. 6 is a section taken on the line VI — VI in FIG. 5.

Details of the construction of the chain shortening coupler which as such is already known in the art will be understood by referring to FIGS. 5 and 6. 57 and 58 are two hooks interconnected on one side by an arched back 59. The prongs 60 and 61 at the ends of the hooks are interconnected by webs 62 and 63. The hooks 57 and 58 and the back 59 together define a pocket-shaped cavity for the reception and support of a link 65 of a chain intended to be attached to the equalising head and placed between the hooks crosswise of the plane of the slot-shaped opening 64 defined by the hooks.

The outsides of the pocket-shaped cavity are lined with resilient insertions 66, the dimensions of these insertions being so chosen that the side portions of the chain link 65 will be retained in the pocket by friction.

The construction of the chain shortening couplers 56 and the manner in which they are attached to the body 43 of the equalising member provide an extremely durable and adaptable suspension means for fastening the chains of the sling to the equalising head. Damaged couplers 56 can be as easily replaced as the shackle 34.

Figure 7:
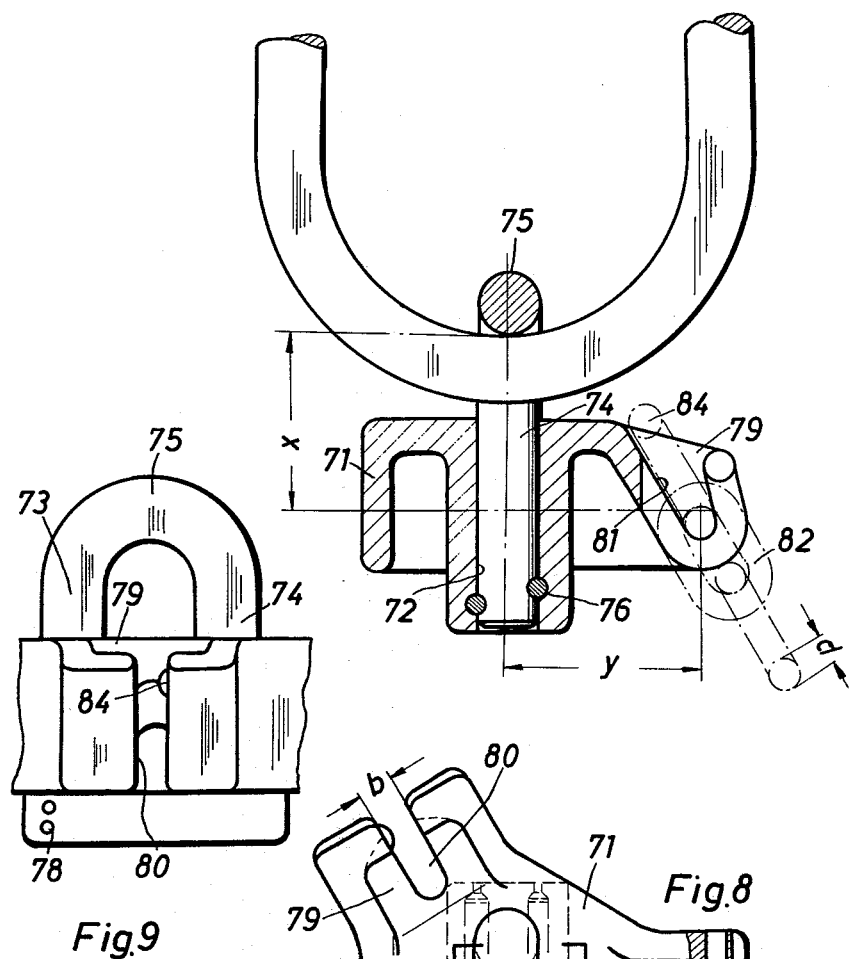
FIG. 7 is a section of a third equalising head.
Figures 8, 9:
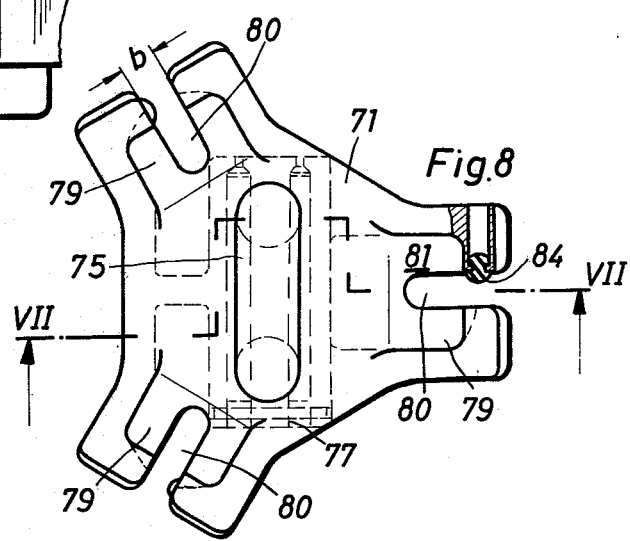
FIG. 8 is a view from above of the equalising head according to FIG. 7.
FIG. 9 is a fragmentary view of the equalising head illustrated in FIGS. 7 and 8, seen from the right in FIG. 7.

Referring now to FIGS. 7 to 9, these illustrate the body 71 of a different embodiment of an equalising head. This body 71 contains two holes 72 near its centre for the reception of the shanks 73 and 74 of a connecting member which again has the form of a clevis type shackle 75. The ends of the shanks 73 and 74 are retained in the holes 72 by locking pins 76. For this purpose the holes 72 are intersected by transverse bores 77. Part of the circumference of each locking pin 76 engages a groove in the end of the cooperating shank 73 and 74, as will be most readily understood by referring to FIG. 7. The transverse bores are of reduced diameter at one end, whereas at the other end the locking pins are located by a pin 78 so that the locking pins 76 cannot accidentally drop out of the transverse bores 77.

Three trough-shaped sockets 79 are spaced around the periphery of the body 71. These trough-shaped sockets 79 are intersected by slots 80. The slots form openings in the bottom 81 of each socket, the bottoms themselves forming supporting surfaces for a chain link 83 which then allows the next chain link pivotably to swing in the slot 80. The width $b$ of the slots therefore exceeds the thickness $d$ of the cross section of the material of the chain links 82 and 83, but not by more than twice this thickness. A resilient projection 84 is formed at the upper end of each slot 80 and forms a retaining element for locking the chain link 82 which is pivotably held in the slot.

The dimensions of the slot 80 and of the trough-shaped socket 79 are such that the link 82 can be unhooked only in a certain position, namely, referring to FIG. 7, only after having been pivotably raised out of the line of pull of the chain in the counterclockwise direction through an angle of about 90°.

Figure 10:
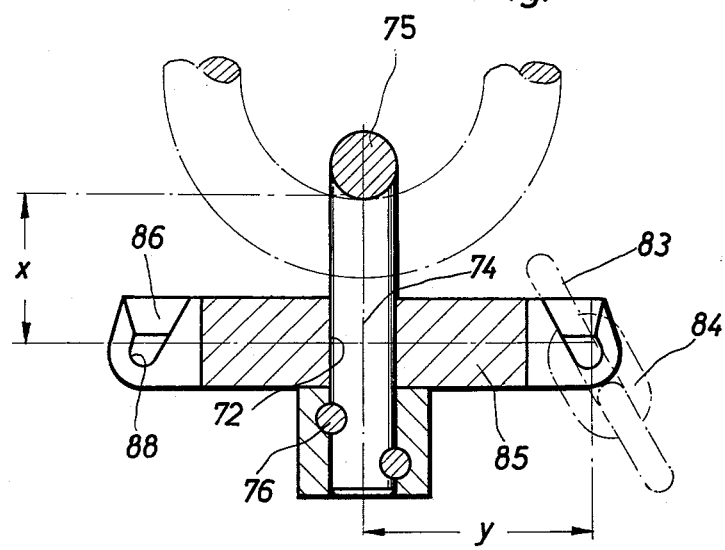
FIG. 10 is a section of an equalising head of modified design.
Figure 11:
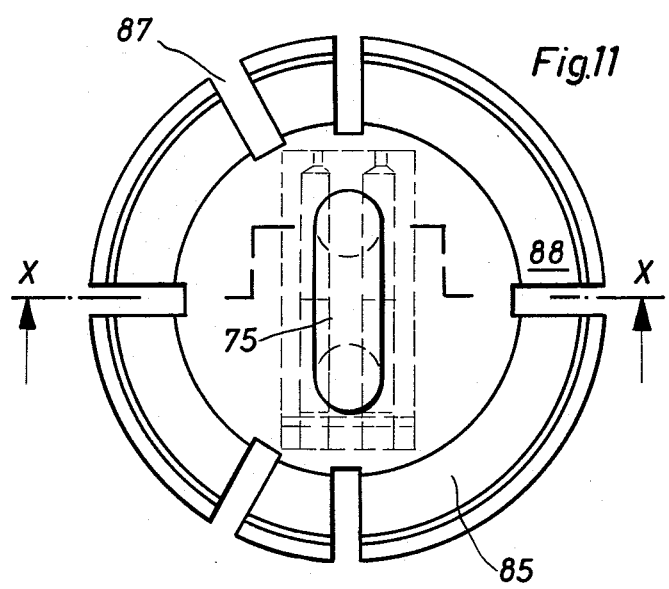
FIG. 11 is a view from above of the equalising head according to FIG. 10.

Whereas the embodiment illustrated in FIGS. 7 to 9 contains a plurality of individual trough-shaped sockets the embodiment shown in FIGS. 10 and 11 shows a body 85 for an equalising head in which the several sockets are merged in a continuous annular trough 86. This trough is perpendicularly intersected by six holes 87 of which three are equiangularly spaced so as to include angles of 120° between them, whereas four are in quadrature at 90° angles. The body 85 is therefore suitable for a sling containing four falls of chain as well as for forming a sling from three falls of chain. It is hardly necessary to emphasize that the embodiment illustrated in FIGS. 10 and 11 excels by its extreme simplicity, not least due to the very simple geometry of the body 85 of the equalising head. In this arrangement a chain link 83 is likewise supported in the bottom 88 of the trough. Otherwise the general design of this equalising head substantially corresponds to that of the equalising head in FIGS. 7 to 9. Corresponding parts are therefore identified by the same reference numbers.

Figure 12:
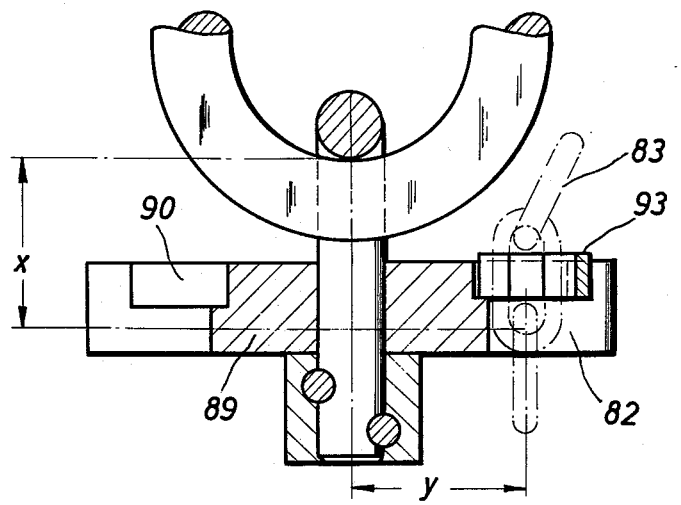
FIG. 12 is yet another equalising head.
Figure 13:
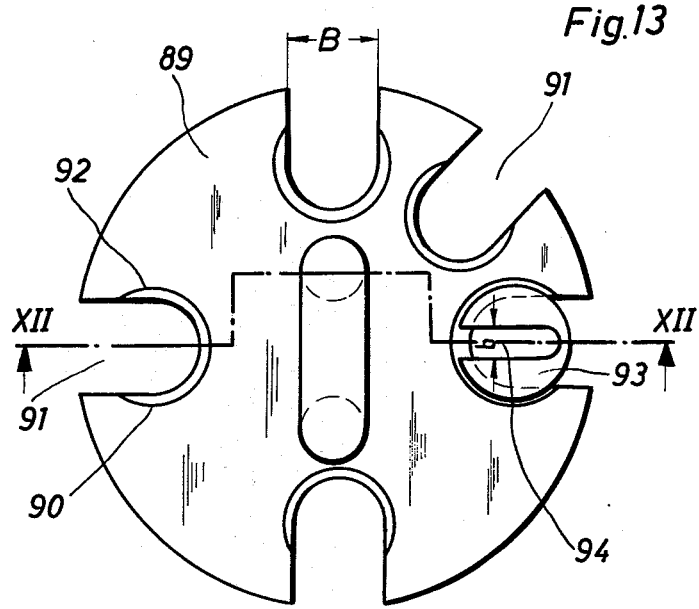
FIG. 13 is a view from above of the equalising head in FIG. 12.

In the embodiment according to FIGS. 12 and 13 the fundamental shape of the body 89 of the equalising head is again plate-shaped, and it contains five sockets 90 intersected by slots 91 and distributed around its periphery. However, in this embodiment the chain link 83 is not supported directly by the bottom 92 of each socket, rather it is held in an adapter 93. This adapter contains a slot 94. The width B of the slots 91 intersecting the sockets 90 slightly exceeds the overall width of the links, whereas the width $b$ of the slots 94 slightly exceeds the thickness of the material forming the chain links 82,83. The use of adapters 93 of the kind illustrated in FIGS. 12 and 13 permits each chain in rotate about its own axis. Moreover, by replacing the adapters 93 by other adapters having different sized slots 94 the equalising head can be used for chains of different dimensions.

Since the chain links 83 in the last three above-described embodiments are supported in the region of their arched ends their straight sides are not subjected to undesirable bending loads.

Moreover, in order to ensure that the equalising head can easily swing into the position of equilibrium in all the above form of construction the pendant length X of the body of the head and the distance $y$ of the pivot points, about which the chains of the sling can swing, from the centre of the body of the equalising head are so chosen that the ratio of X to $y$ is smaller than or equal to unity.

What is claimed is:

1. In an improved equalising head for a chain sling of the type comprising a hanger, a first connecting member for connecting the hanger to an equalising head, and a plurality of secondary connecting members for connecting individual falls of chain to said equalising head, the improvement comprising:

said first connecting member being a clevis-type shackle ending in shanks, said shanks of said first connecting member having parallel grooves on opposite sides thereof, said equalising head having openings therein to receive said shanks and said equalising head having parallel bores adjacent to and transverse to said openings, said parallel bores being complementary to said grooves on said shanks, said shanks being insertably fitted into said openings with said respective grooves and bores in alignment, and locking elements positioned within said bores to retain said shanks within said equalising head, thereby securing said shanks of said first connecting member to said equalising head, whereby said first connecting member is detachably fastened to said equalising head.

2. An equalising head as recited in claim 1 wherein said grooves are relatively staggered in the axial direction of said shanks of said first connecting member.

3. An equalising head as described in claim 1 further comprising an anchoring portion made from a plate, said anchoring portion affixed to the underside of said equalising head and having openings for the reception of said shanks of said first connecting member.

4. An equalising head as described in claim 1 wherein said plurality of secondary connecting members comprise secondary clevis-type shackles ending in secondary shanks, said secondary shanks having parallel secondary grooves on opposite sides thereof,
   said equalising head having secondary openings therein to receive said secondary shanks and said equalising head having parallel secondary bores adjacent to and transverse to said secondary openings, said parallel secondary bores being complementary to said secondary grooves on said secondary shanks,
   said secondary shanks being insertably fitted into said secondary openings with said respective secondary grooves and secondary bores being in alignment, and
   secondary locking elements positioned within said secondary bores to retain said secondary shanks within said equalising head, thereby securing said secondary shanks of said secondary connecting members to said equalising head,
   whereby said secondary connecting members are detachably fastened to said equalising head.

5. An equalising head as recited in claim 4 wherein the secondary locking elements are pins.

6. An equalising head as recited in claim 1 wherein the locking elements are pins.

7. An equalising head as recited in claim 1 wherein the length of said first connecting member is sufficient to allow said equalising head to swing into a position favorable for support of a load by said equalising head.

8. An equalising head as recited in claim 1 wherein said secondary connecting members comprise:
   chain shortening couplers formed by two hooks interconnected by an arched back and having substantially parallel prongs connected to the body of the coupler by webs at least at their ends, and forming a pocket-like cavity for the reception and support of a chain link placed substantially perpendicularly to the plane of the slot defined by the prongs whereby falls of chain are releasably connected to said equalising head.

9. An equalising head as recited in claim 8 further comprising swivel pins with first bores,
   said swivel pins extending through said equalising head,
   secondary openings in said equalising head for the reception of said swivel pins,
   said swivel pins having tops with diameters larger than said secondary openings thereby preventing said swivel pins from falling through said equalising head,
   and said chain shortening couplers having second bores in alignment with said first bores of said swivel pins below the underside of said equalising head, and load bearing pivot pins inserted through said first and second bores,
   wherein said chain shortening couplers are detachably affixed to said swivel pins by said load bearing pivot pins passing through said first and second bores.

10. An equalising head as recited in claim 1 wherein the secondary connecting members comprise a plurality of troughs and slots, said slots intersecting said troughs and forming downwardly open gaps in the bottom of each of said troughs thereby constituting a surface for supporting and retaining a chain link.

11. An equalising head as recited in claim 10 wherein the secondary connecting members comprise six slots of which four of said slots are positioned in quadrature and three of said slots are spaced equidistantly at 120° angular intervals, whereby the equalising head may utilize both three and four falls of chain when in operation.

12. An equalising head as recited in claim 10 wherein the upper end of said slots is provided with a resilient projection thereby forming a locking element for the chain link which is movably located in the slot.

13. An equalising head as recited in claim 10 further comprising adapters,
   said adapters being inserted into said troughs,
   said adapters having adapter slots for carrying a chain link,
   said adapters resting on the bottom of said troughs, the width of the slot of said trough being slightly greater than the width of said chain link, and the width of the adapter slots being slightly greater than the thickness of the material forming said chain link.

* * * * *